United States Patent
Kleinecke et al.

(10) Patent No.: US 10,644,484 B2
(45) Date of Patent: May 5, 2020

(54) ARC RESISTANT EXHAUST AND INTAKE FOR DRIVES AND SWITCHGEAR

(71) Applicant: Toshiba International Corporation, Houston, TX (US)

(72) Inventors: John Kleinecke, Wichita Falls, TX (US); Jack Davis, Houston, TX (US); Enrique Martinez, Cypress, TX (US)

(73) Assignee: Toshiba International Corporation, Houston, TX (US)

( * ) Notice: Subject to any disclaimer, the term of this patent is extended or adjusted under 35 U.S.C. 154(b) by 3 days.

(21) Appl. No.: 16/123,565

(22) Filed: Sep. 6, 2018

(65) Prior Publication Data
US 2020/0083677 A1    Mar. 12, 2020

(51) Int. Cl.
| | |
|---|---|
| H02B 1/56 | (2006.01) |
| H02B 11/24 | (2006.01) |
| H02B 13/025 | (2006.01) |
| H01H 33/70 | (2006.01) |
| H01H 33/26 | (2006.01) |
| H02B 11/133 | (2006.01) |
| H02B 1/14 | (2006.01) |

(52) U.S. Cl.
CPC ............. *H02B 1/565* (2013.01); *H01H 33/26* (2013.01); *H01H 33/703* (2013.01); *H02B 11/24* (2013.01); *H02B 13/025* (2013.01); *H02B 1/14* (2013.01); *H02B 11/133* (2013.01)

(58) Field of Classification Search
None
See application file for complete search history.

(56) References Cited

U.S. PATENT DOCUMENTS

| | | | | |
|---|---|---|---|---|
| 5,672,036 A | * | 9/1997 | Medal ................. | B65D 23/104 411/171 |
| 6,407,331 B1 | * | 6/2002 | Smith ................. | H02B 13/025 174/17 VA |
| 6,417,443 B1 | * | 7/2002 | Smith .................... | H02B 1/565 174/17 VA |
| 8,375,566 B2 | | 2/2013 | Ballard et al. | |
| 9,426,907 B2 | * | 8/2016 | Karandikar ............ | H02B 1/565 |
| 9,577,411 B2 | * | 2/2017 | Deb ....................... | H02B 13/025 |
| 2003/0117045 A1 | * | 6/2003 | Byron .................... | H01H 31/12 312/199 |
| 2003/0119344 A1 | * | 6/2003 | Byron ................... | H01H 31/003 439/95 |
| 2012/0028559 A1 | * | 2/2012 | Kingston ............. | H05K 5/0213 454/184 |
| 2013/0320831 A1 | * | 12/2013 | Schmidt ............... | H02B 13/025 312/296 |

(Continued)

*Primary Examiner* — Xanthia C Cunningham
(74) *Attorney, Agent, or Firm* — Baker Botts L.L.P.

(57) ABSTRACT

In accordance with presently disclosed embodiments, an arc resistant exhaust and intake for medium and high voltage switchgear is provided. In one embodiment, an arc resistant drive system may comprise: a drive cabinet comprising a vent; and an arc resistant shutter plate assembly coupled to the drive cabinet and aligned adjacent to the vent, wherein the arc resistant shutter plate assembly comprises a plurality of shutter plates configured to automatically transition from an open position to a closed position when air pressure inside the drive cabinet exceeds a predetermined value, such that the shutter plates substantially restrict air flow through the vent in the closed position.

18 Claims, 6 Drawing Sheets

(56) References Cited

U.S. PATENT DOCUMENTS

| | | | | |
|---|---|---|---|---|
| 2014/0133071 | A1* | 5/2014 | Gingrich | H02B 1/565 |
| | | | | 361/678 |
| 2016/0035518 | A1* | 2/2016 | Pawar | H02B 1/56 |
| | | | | 218/157 |
| 2016/0042896 | A1* | 2/2016 | Kingston | H01H 33/53 |
| | | | | 218/157 |
| 2016/0169554 | A1* | 6/2016 | Ma | F23J 11/00 |
| | | | | 122/155.2 |
| 2016/0294171 | A1* | 10/2016 | Lafond | H02G 3/081 |
| 2016/0333921 | A1* | 11/2016 | Limatoc | F16B 39/34 |
| 2017/0063052 | A1* | 3/2017 | Johnson | H02B 1/306 |
| 2017/0365987 | A1* | 12/2017 | Ionescu | H02B 13/025 |
| 2018/0323022 | A1* | 11/2018 | Skibinski | H01H 33/08 |
| 2019/0148921 | A1* | 5/2019 | Bellows | H02B 1/28 |
| | | | | 361/622 |

* cited by examiner

ARC RESISTANT EXHAUST AND INTAKE FOR DRIVES AND SWITCHGEAR

TECHNICAL FIELD

Embodiments of the present disclosure relate to medium and high voltage drives and power systems and, more particularly, to systems and methods for arc resistant exhaust and intake for medium and high voltage drives and switchgear.

BACKGROUND

Medium and high voltage drives and switchgear are susceptible to arc fault or arc flash. Arc fault or arc flash in an enclosure can produce large amounts of high temperatures and pressure gases that may be harmful to people or cause damage to electrical equipment. For example, uncontrolled release of arc gas out from medium and high voltage drives during normal operation may pose a risk to people in the vicinity and cause damage to exhaust assemblies. Thus, it is desirable to restrict flow of and redirect harmful arc gas to a proper ventilation area.

Current designs are inadequate to redirect arc gas. For example, some designs use a single large plate which may be difficult to operate or unreliable due to the weight of the plate. Additionally, such designs may require large pressure changes, and thus, may not react as quickly in early stages of an arc fault. The present disclosure provides a method of early detection and protection of personnel and equipment in the event of an arc fault.

SUMMARY

In accordance with the above, presently disclosed embodiments are directed to systems and methods for arc resistant exhaust and intake for medium and high voltage drives and switchgear.

In some embodiments, an arc resistant drive system may comprise: a drive cabinet comprising a vent; and an arc resistant shutter plate assembly coupled to the drive cabinet and aligned adjacent to the vent, wherein the arc resistant shutter plate assembly comprises a plurality of shutter plates configured to automatically transition from an open position to a closed position when air pressure inside the drive cabinet exceeds a predetermined value, such that the shutter plates substantially restrict air flow through the vent in the closed position.

In some embodiments, an arc resistant shutter plate assembly may comprise: one or more frames; and a plurality of shutter plates coupled to the one or more frames, wherein the plurality of shutter plates are aligned parallel to one another, and wherein the plurality of shutter plates are operable to automatically transition from an open position and a closed position based on a change in surrounding air pressure.

In some embodiments, a method for ventilating arc gas may comprise: disposing an arc resistant shutter plate assembly over an exhaust vent, wherein the arc resistant shutter plate assembly is coupled to a drive cabinet; automatically transitioning the arc resistant shutter plate assembly from an open position to a closed position upon a change in air pressure; directing air flow within the drive cabinet to an arc gas chamber; and ventilating air flow out of the arc gas chamber and the drive cabinet.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Illustrative embodiments of the present disclosure are described in detail herein. In the interest of clarity, not all features of an actual implementation are described in this specification. It will of course be appreciated that in the development of any such actual embodiment, numerous implementation-specific decisions must be made to achieve the developers' specific goals, such as compliance with system related and business-related constraints, which will vary from one implementation to another. Moreover, it will be appreciated that such a development effort might be complex and time consuming but would nevertheless be a routine undertaking for those of ordinary skill in the art having the benefit of the present disclosure. Furthermore, in no way should the following examples be read to limit, or define, the scope of the disclosure.

Figure 1:
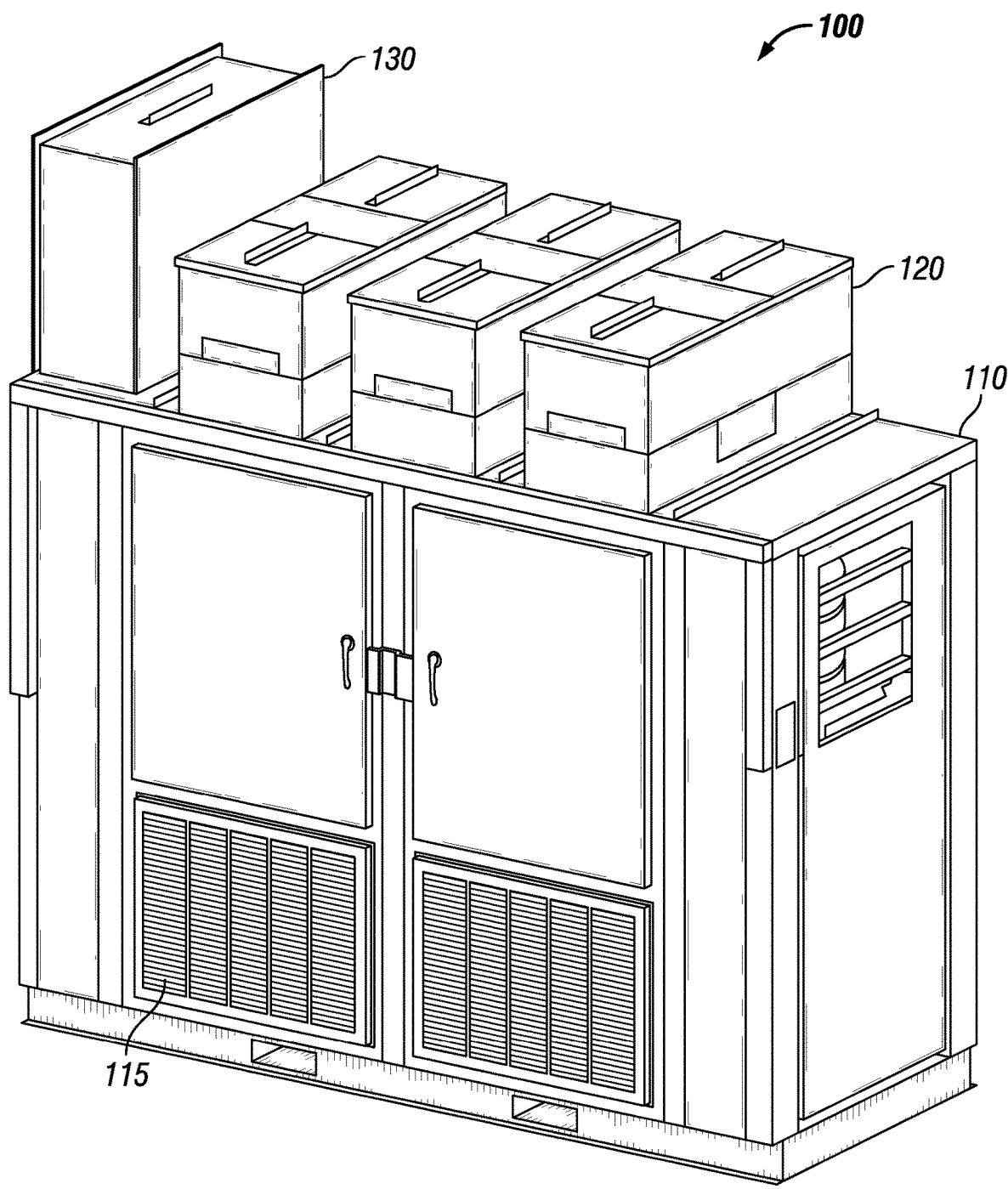
FIG. 1 is a view of the exterior of a drive cabinet, in accordance with certain embodiments of the present disclosure.

Turning now to the figures, FIG. 1 shows a front view of an arc resistant drive system 100 comprising a drive cabinet 110. Drive cabinet 110 may comprise one or more medium or high voltage drives and accompanying medium or high voltage switchgear (not shown). Drive cabinet 110 may comprise one or more exhaust fan assemblies 120. As would be understood by one of ordinary skill in the art, the number of exhaust fan assemblies 120 may vary in accordance with the size of drive cabinet 110, or the drive rating of the medium or high voltage drive. Any suitable number of exhaust fan assemblies 120 may be used in accordance with embodiments of the present disclosure. As shown in FIG. 1, one or more exhaust fan assemblies 120 may be disposed on or near the top of drive cabinet 110 for ventilating air from the drive cabinet 110.

Drive cabinet 100 may further comprise an arc gas chamber 130. Arc gas chamber 130 may be intended for storing and ventilating arc gas. Arc gas chamber 130 may be disposed on top or near the top of drive cabinet 110, and in some embodiments, may be adjacent to one or more arc resistant fan assemblies 120. In some embodiments, one or more arc gas chambers 130 may be used (not shown).

Drive cabinet 110 may further comprise one or more intakes 115. As shown in FIG. 1, one or more intakes 115 may be disposed on a side panel of drive cabinet 110. In some embodiments, one or more intakes 115 may be positioned near the bottom of cabinet 110 for ventilating air into the drive cabinet 110.

Figure 2A:
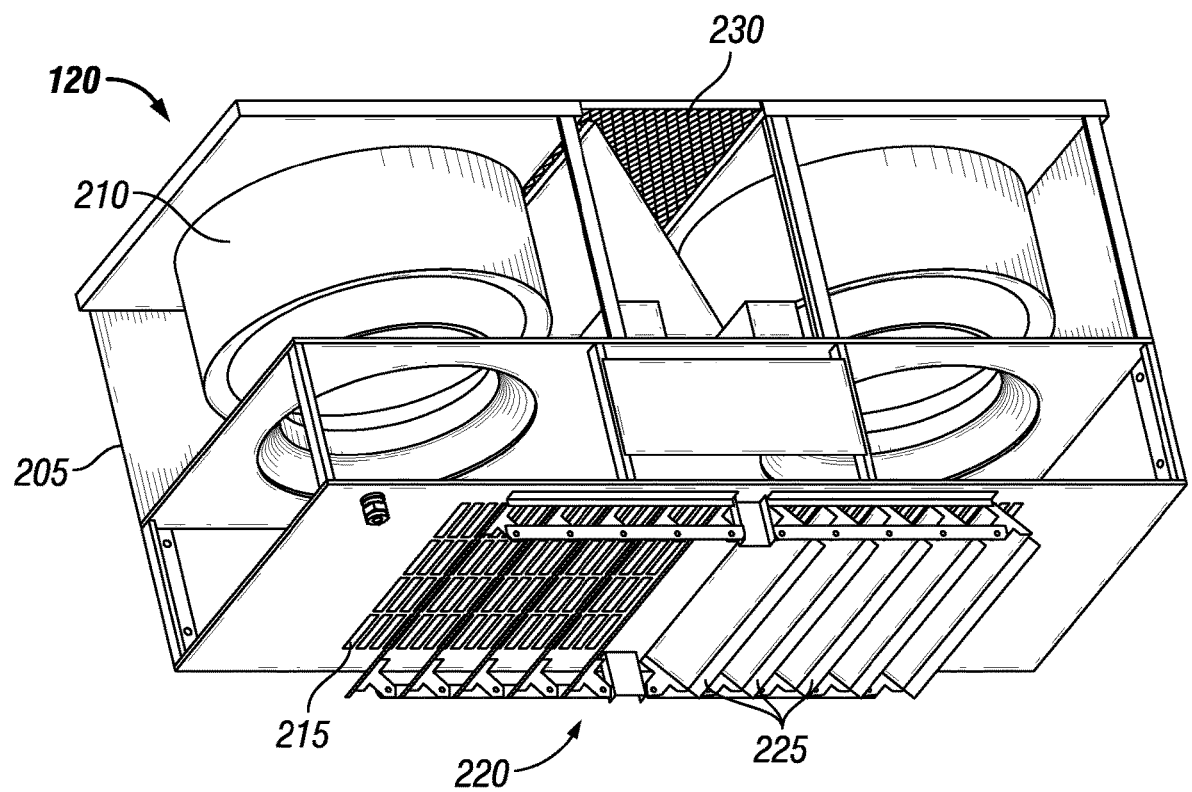
FIG. 2A is a cross-sectional view of an exhaust fan assembly in an open position, in accordance with certain embodiments of the present disclosure.
Figure 2B:
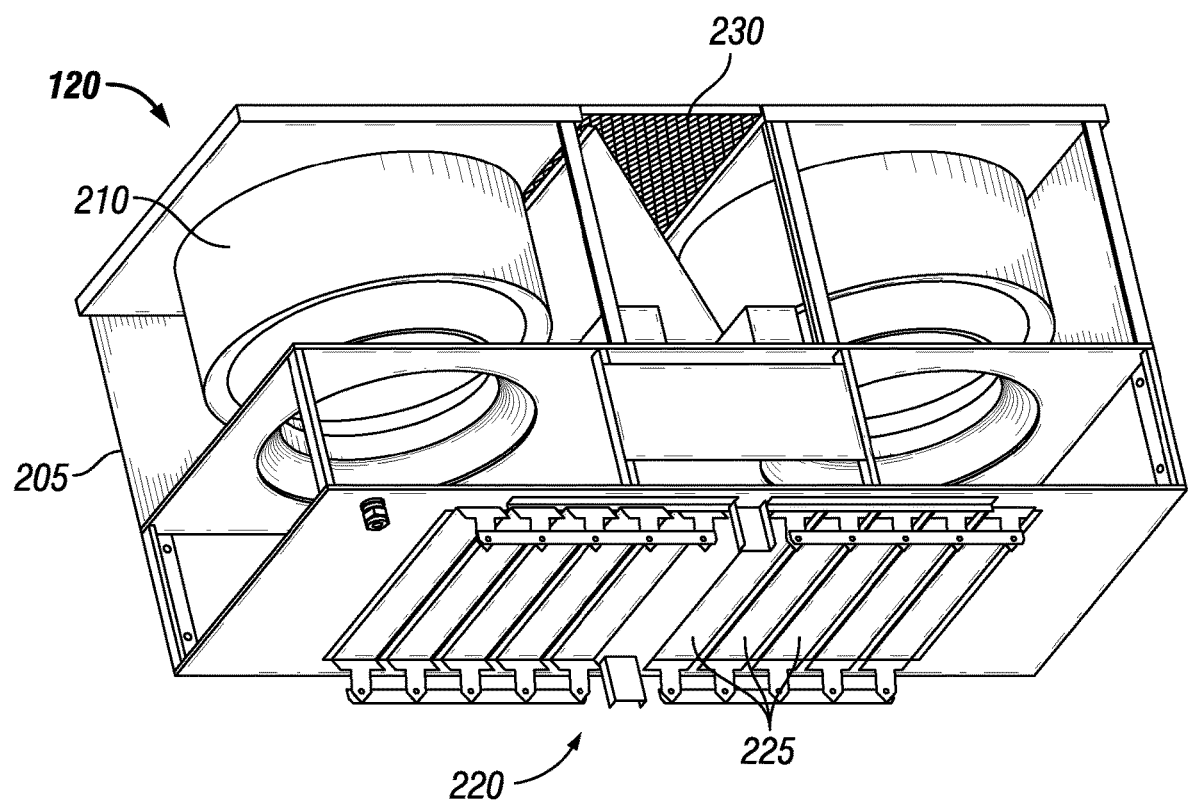
FIG. 2B is a cross-sectional view of an exhaust fan assembly in a closed position, in accordance with certain embodiments of the present disclosure.

Turning now to FIGS. 2A and 2B, a cross-sectional view of an exemplary exhaust fan assembly 120 is shown in isolation. Exhaust fan assembly 120 may comprise an enclosure 205, which may house one or more fans 210. In some embodiments, one or more fans 210 may be completely or substantially disposed within enclosure 205. Exhaust fan assembly 120 may further comprise an exhaust vent 215. As shown in FIGS. 2A and 2B, exhaust vent 215 may be mounted horizontally across a bottom plane of enclosure 205. As such, when exhaust fan assembly is disposed on top of drive cabinet 110 as shown in FIG. 1, exhaust vent 215 may allow fluid communication between exhaust fan assembly 120 and drive cabinet 110. For example, one or more fans 210 may circulate air from drive cabinet 110, through exhaust vent 215, and into exhaust fan assembly 120.

Additionally, exhaust fan assembly 120 may comprise an exhaust release 230. Exhaust release 230 may be mounted horizontally across a top plane of enclosure 205, parallel to exhaust vent 215. Exhaust release 230 may provide for fluid communication between the interior and exterior of exhaust fan assembly 120. For example, one or more fans 210 may circulate air received through exhaust vent 215 into enclosure 205, and further circulate air out of exhaust vent 230. As such, exhaust release 230 may allow air to flow out of exhaust fan assembly 120.

Exhaust fan assembly 120 may further comprise an arc resistant shutter plate assembly 220. Arc resistant shutter plate assembly may be mounted, attached, or coupled to the enclosure 205, the exhaust vent 215, or both.

Figure 2C:
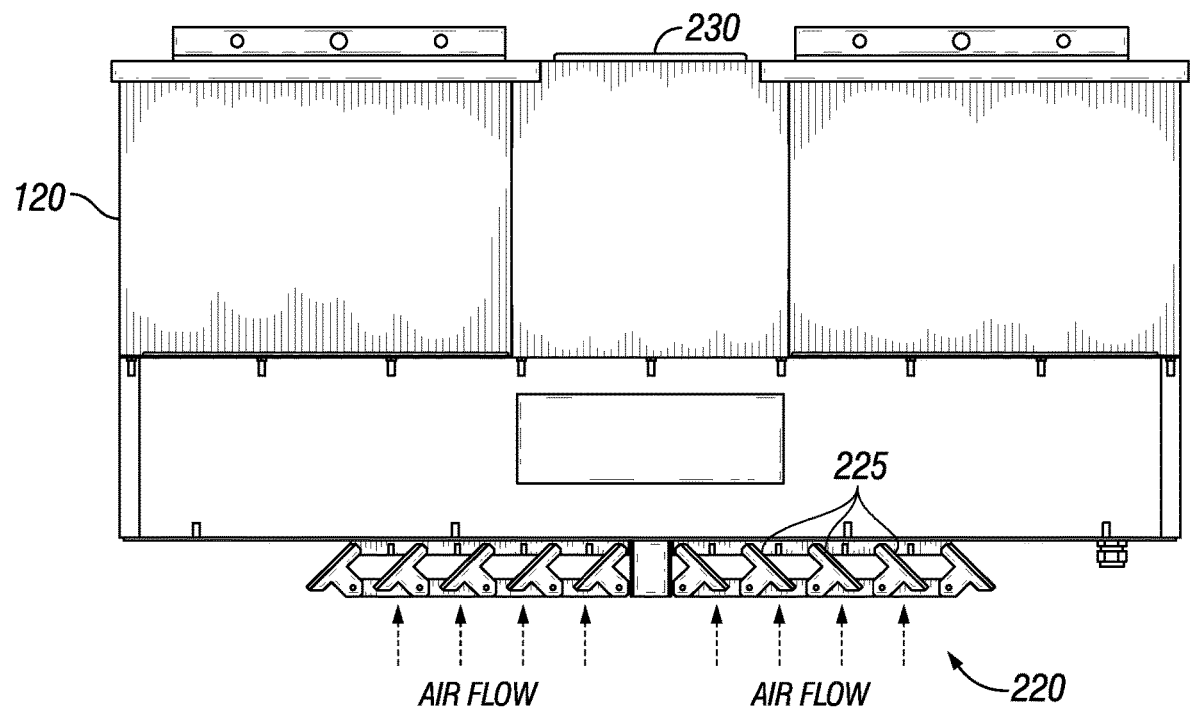
FIG. 2C is a side view of the exhaust fan assembly in FIG. 2A, in accordance with certain embodiments of the present disclosure.

FIG. 2A illustrates an arc resistant shutter plate assembly 220 in an open position. In an open position, arc resistant shutter plate assembly 220 may be configured such that shutter plates 225 are not substantially parallel to exhaust vent 215. This configuration of shutter plates 225 may allow fluid communication between drive cabinet 110 and enclosure 205. In some embodiments, shutter plates 225 may be aligned at an angle 30°, 45°, 60°, 75°, 90°, or any other suitable angle from the exhaust vent 215, such that air may freely flow through shutter plates 225. For example, "not substantially parallel" may mean that shutter plates 225 allow air to flow unrestricted from drive cabinet 110 into enclosure 205. FIG. 2C depicts the direction of air flow from a drive cabinet 110 (not shown) of FIG. 1 to an exhaust fan assembly 120 when the arc resistant shutter plate assembly 220 is in an open position.

FIG. 2B illustrates an arc resistant shutter plate assembly 220 in a closed position. In a closed position, arc resistant shutter plate assembly 220 may be configured such that shutter plates 225 are substantially parallel to and completely cover exhaust vent 215. This configuration of shutter plates 225 may restrict or prevent fluid communication between drive cabinet 110 and enclosure 205. In some embodiments, "substantially parallel" may mean that shutter plates 225 are completely parallel or aligned with exhaust vent 215. In other embodiments, "substantially parallel" may mean that shutter plates 225 are aligned at an angle less than 5°, 10°, 20°, or 30° from the one or more exhaust intakes 215, but that air flow is substantially restricted by shutter plates 225. In some embodiments, "substantially parallel" may mean that shutter plates 225 are aligned such that shutter plates 225 prevents air flow from drive cabinet 110 to enclosure 205. In some embodiments, shutter plates 225 in a closed position have no gaps between any two shutter plates 225.

Arc resistant shutter plate assembly 220 may be configured such that shutter plates 225 automatically swivels, rotates, or pivots from an open position to a closed position upon a change in air pressure. Changes in air pressure within the drive cabinet 110 may be indicative of an arc fault or arc flash. For example, in the presence of an arc fault or arc flash, if the air pressure in drive cabinet 110 becomes greater than the air pressure in exhaust fan assembly 120, arc resistant shutter plate assembly 220 may automatically transition from an open position to a closed position. As a result, harmful arc gas may be prevented from flowing from the drive cabinet 110 to the exhaust fan assembly 120. In some embodiments, arc resistant shutter plate assembly may transition from an open position to a closed position when the air pressure inside drive cabinet 110 is a predetermined value greater than the air pressure inside enclosure 205 of exhaust fan assembly 120. For example, in some embodiments, the arc resistant shutter plate assembly may transition from an open position to a closed position when the air pressure inside drive cabinet 110 is 5 psi greater than the air pressure of enclosure 205 of exhaust fan assembly 120. As would be understood by one of ordinary skill in the art, another predetermined value may be chosen for a change in air pressure that triggers the arc resistant shutter plate assembly 220.

The arc resistant shutter plate assembly may be configured such that shutter plates 225 transition from an open position to a close position without use of any force besides the increased air pressure on one side of the shutter plates 225. For example, in some embodiments, the increase air pressure in drive cabinet 110 may exert a force on one side of the shutter plates 225, causing the shutter plates 225 to transition from an open position to a closed position. In other embodiments, additional components may be used in accordance with embodiments of the present disclosure to detect air pressure changes, for example, an air pressure sensor. In other embodiments, additional components may be used in accordance with embodiments the present disclosure to facilitate movement of the shutter plates 225, for example, a motor or motorized shutter plate assembly (not shown). However, such additional components are not necessary to achieve the object of the present disclosure.

Figure 3A:
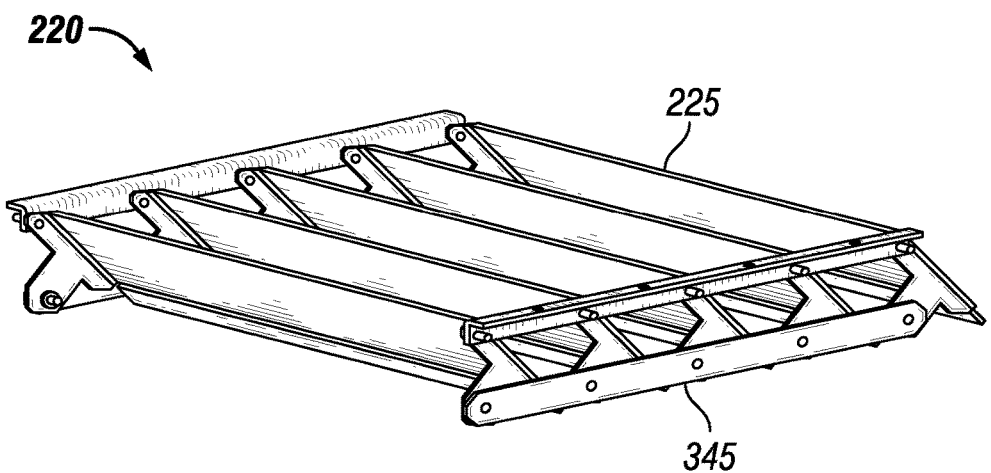
FIG. 3A is a view of an arc-resistant shutter plate assembly in isolation, in accordance with certain embodiments of the present disclosure.
Figure 3B:
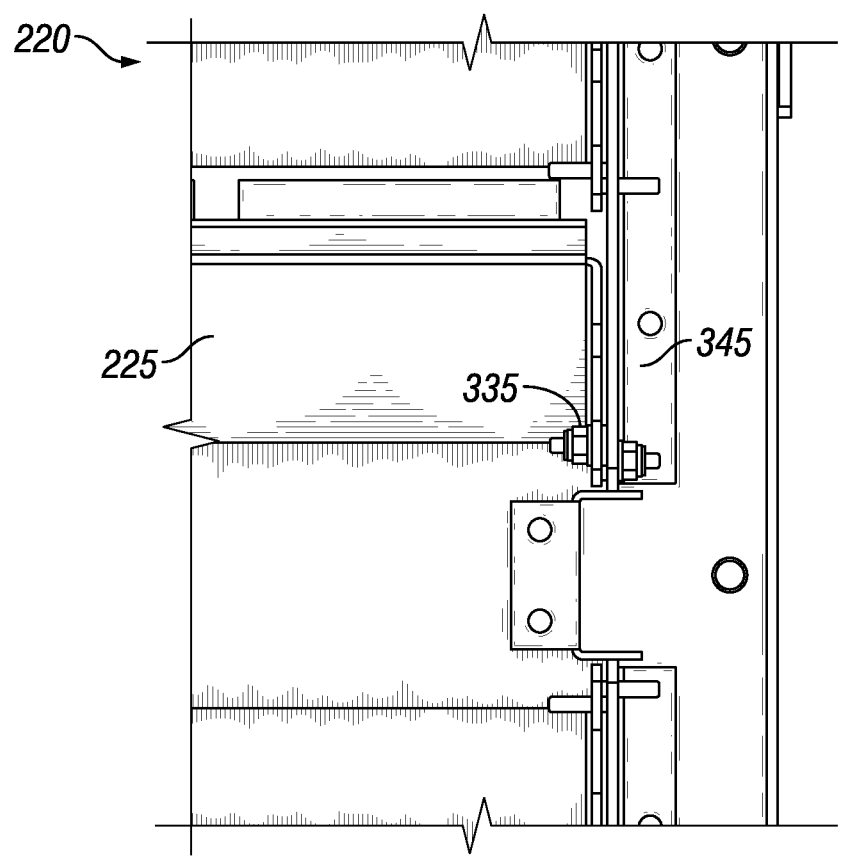
FIG. 3B is an enlarged view of an arc-resistant shutter plate assembly, in accordance with certain embodiments of the present disclosure.

Turning now to FIGS. 3A and 3B, an arc resistant shutter plate assembly 220 is shown. Arc resistant shutter plate assembly 220 may comprise a plurality of shutter plates 225 aligned parallel to one another. In some embodiments, shutter plates 225 may rotate, swivel, or pivot about end points, as discussed herein. Shutter plates 225 may be configured such that each of the plurality of shutter plates 225 move in unison with another. Shutter plates 225 may be comprised of carbon steel, stainless steel, aluminum, or other material suitable to sufficiently restrict or prevent air flow as understood by one of ordinary skill in the art. In some embodiments, the material of shutter plates 225 may be chosen based on a desired weight of shutter plates 225, for example, 1-5 lbs per shutter plate. In some embodiments, the number and size of shutter plates 225 may be determined based on the surface area of an exhaust fan assembly 120, exhaust vent 215, or an intake 115. For example, the number and size of shutter plates 225 may be selected such that the total surface area of shutter plates 225 is greater than the surface area of the exhaust vent 215, intake 115, or both.

FIG. 3B depicts an enlarged view of arc resistant shutter plate assembly 220 comprising one or more frames 345. In some embodiments, as shown in FIGS. 2A and 2B, shutter plate assembly 220 may comprise two frames 345 on opposite ends of shutter plates 225. Frames 345 may attach, mount, or otherwise couple arc resistant shutter plate assembly 220 to the exhaust fan assemblies 120. Arc resistant shutter plate assembly 220 may be mounted, attached, or coupled by any suitable means as understood by one of ordinary skill in the art. For example, in some embodiments, arc resistant shutter plate assembly 220 may be mounted, attached, or coupled to exhaust fan assemblies 120 by nuts, bolts, screws, fasteners, or any other type of tightening or any other fastening mechanism 335.

Frames 345 may be coupled to shutter plates 225 by a fastening mechanism 335 such that shutter plates 225 can swivel, pivot, or rotate about end points of shutter plates 225 coupled to one or more fastening mechanisms 340. For example, in some embodiments, shutter plates 225 may be coupled to frames 215 via hex lock nuts. Fastening mechanism 335, such as hex lock nuts, may allow shutter plates 225 to swivel, pivot, or rotate about fastening mechanism 335 with minimal resistance. Additionally, hex lock nuts or other suitable equivalents may resist loosening under torque, and thus, ensure that shutter plates 225 stay in proper position. In some embodiments, fastening mechanism 335, for example, hex lock nuts, may be torqued to a desired value to allow for proper positioning and rotation of shutter plates 225. The tension in fastening mechanism 335 may be adjusted so that shutter plates 225 transition from an open position to a closed position at various changes in air pressure. For example, in some embodiments, hex lock nuts may be torqued to a value 2-20 ft-lbs, such that shutter plates 225 transition from an open position to a closed position when there is a pressure change of about 5 psi.

Figure 4A:
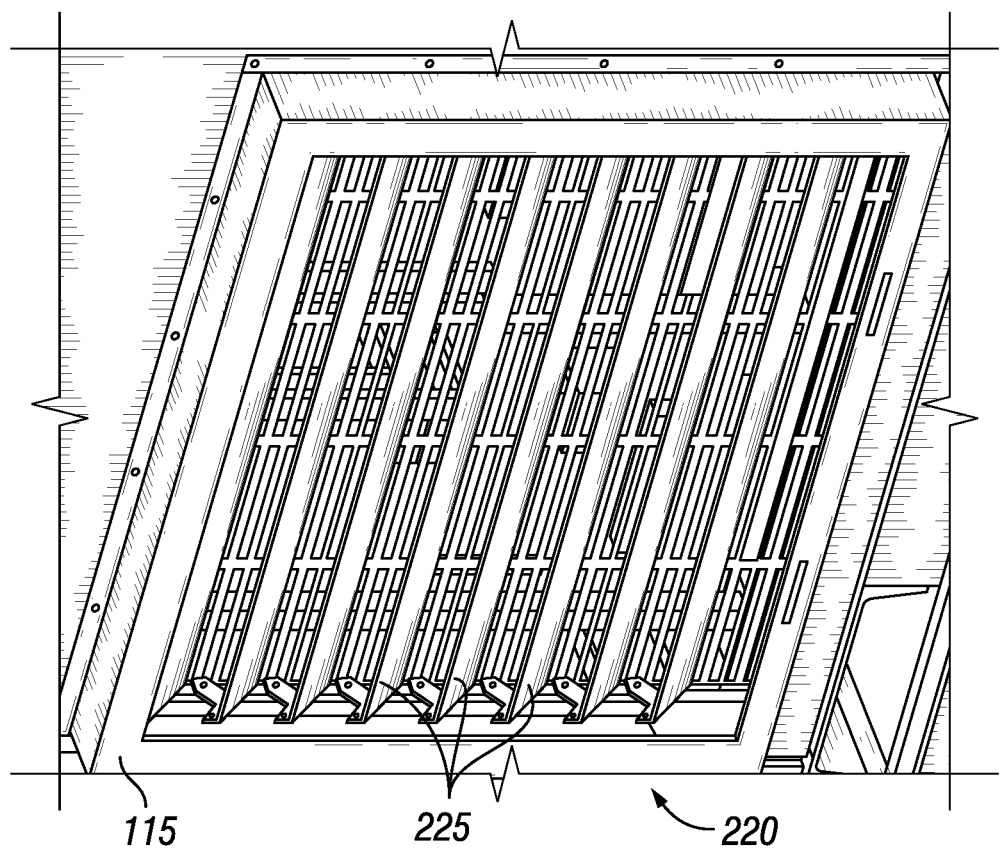
FIG. 4A is an enlarged view of an intake assembly in an open position, in accordance with certain embodiments of the present disclosure.
Figure 4B:
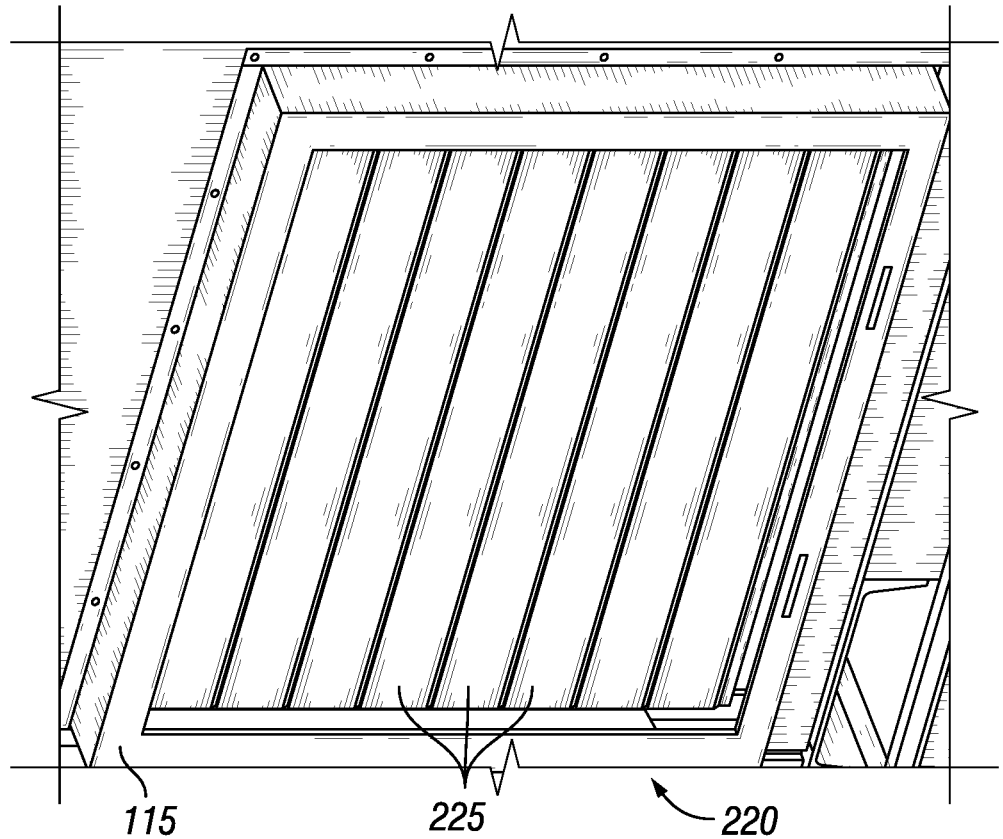
FIG. 4B is an enlarged view of an intake assembly in a closed position, in accordance with certain embodiments of the present disclosure.

FIGS. 4A and 4B depict an arc resistant shutter plate assembly 220 coupled to an intake 115 of drive cabinet 110. In some embodiments, arc resistant shutter plate assembly 220 may be used in a similar manner as described above with respect to FIGS. 2A and 2B, except that arc resistant shutter plate assembly 220 is mounted vertically along an intake 115. FIG. 4A depicts an arc resistant shutter plate assembly 220 in an open position, such that air is allowed to flow from the exterior to the interior of drive cabinet 110. Upon a detected change in air pressure, shutter plates 225 of arc resistant shutter plate assembly 220 may automatically transition to a closed position as shown in FIG. 4B. For example, in the presence of an arc fault or arc flash, if the air pressure in drive cabinet 110 becomes drastically greater than the air pressure outside of drive cabinet 110, arc resistant shutter plate assembly 220 may automatically transition from an open position to a closed position. In this closed position, shutter plates 225 may substantially restrict air flow, such that no air flow occurs between the exterior and interior of drive cabinet 110. As a result, harmful arc gas may be prevented from exiting the drive cabinet 110 and redirected to chamber 130.

Figure 5:
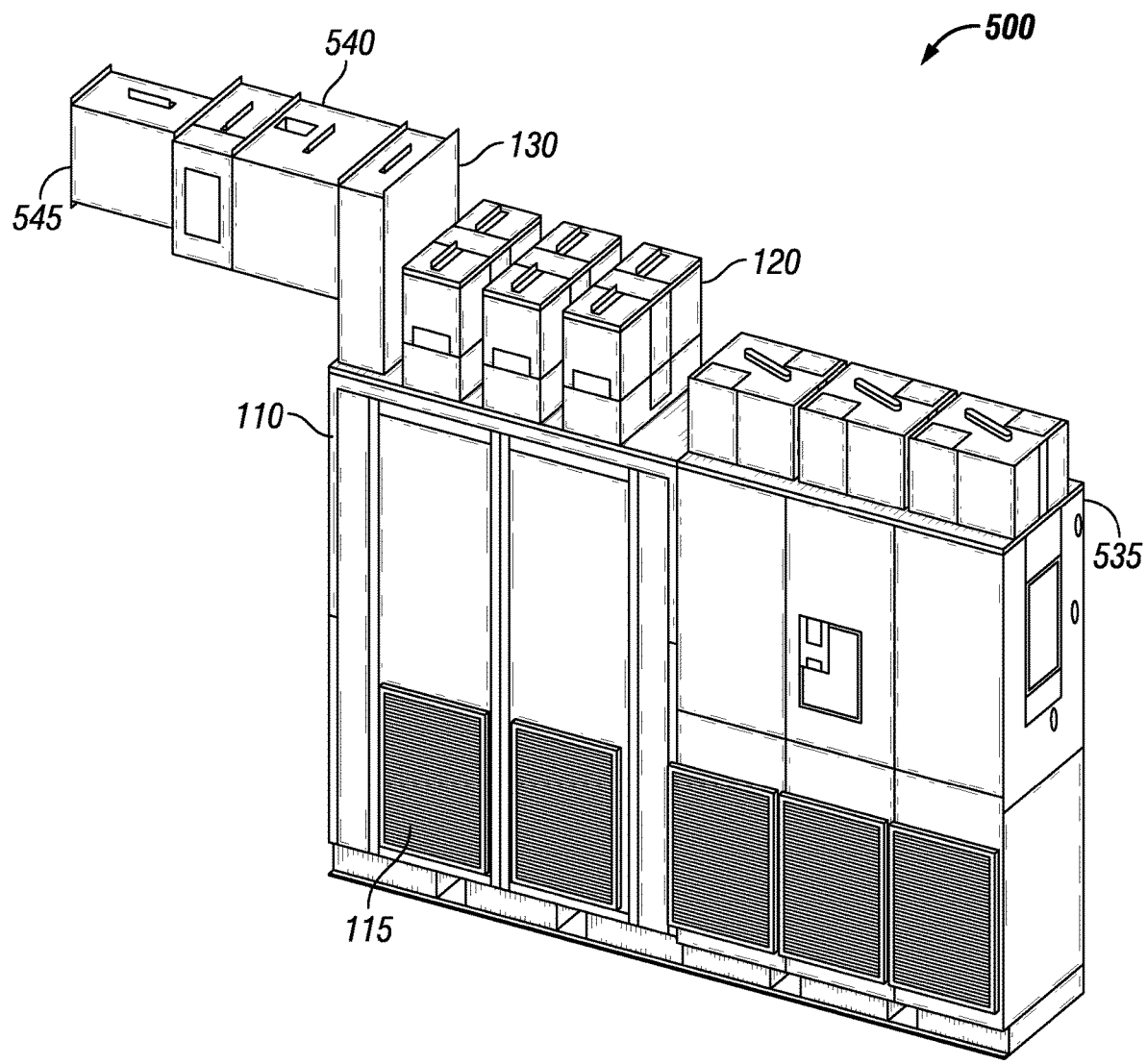
FIG. 5 is a view of the exterior of a drive cabinet with a duct release, in accordance with certain embodiments of the present disclosure.

FIG. 5 depicts a drive cabinet 110 and an inverter cubicle 535 coupled to one another. Drive cabinet 110 and inverter cubicle 535 may be positioned relative to one another such that arc gas chamber 130 is positioned away from inverter cubicle 535. One or more ducts 540 may be coupled to arc gas chamber 130 for routing arc gas stored in arc gas chamber 130 away from drive cabinet 110, inverter cubicle 535, and any other electrical and mechanical equipment (not shown). A duct 540 may also comprise a duct release 545 for allowing air to escape from the duct 540. The length and number of ducts 540 may be based on safety or environmental standards. In certain embodiments, where drive cabinet 110 is an indoor drive cabinet, ducts 540 may route arc gas to the exterior of the building. Inverter cubicle 535 and drive cabinet 110 may be fluidically coupled such that air may be routed between inverter cubicle 535 and drive cabinet 110. Such a configuration may allow harmful arc gas to be routed from inverter cabinet 535 to drive cabinet 110, and further routed to side arc gas chamber 130 and out of ducts 540.

Thus, the present disclosure provides improved systems and methods for safely handling and routing harmful arc gas. As would be understood by one of ordinary skill in the art, any number of arc resistant shutter assemblies 220 may be used with a given drive cabinet or enclosure.

What is claimed is:

1. An arc resistant drive system comprising:
    a drive cabinet comprising a vent;
    an arc resistant shutter plate assembly coupled to the drive cabinet and aligned adjacent to the vent, wherein the arc resistant shutter plate assembly comprises a plurality of shutter plates configured to automatically transition from an open position to a closed position when air pressure inside the drive cabinet exceeds a predetermined value, such that the shutter plates substantially restrict air flow through the vent in the closed position; and
    an arc gas chamber positioned to receive arc gas redirected by the shutter plate assembly, wherein the arc gas chamber is disposed on top of the drive cabinet and configured to store the received arc gas.

2. The arc resistant drive system of claim 1, wherein the arc gas chamber ventilates arc gas out of the drive cabinet.

3. The arc resistant drive system of claim 1, further comprising:
    an exhaust fan assembly, wherein the arc resistant shutter plate assembly is disposed between the drive cabinet and the exhaust fan assembly, wherein the plurality of shutter plates automatically transition from the open position to the closed position when air pressure inside the drive cabinet exceeds air pressure the exhaust fan assembly by a predetermined value.

4. The arc resistant drive system of claim 1, wherein the drive cabinet further comprises an intake, and wherein the arc resistant shutter plate assembly is coupled to the drive cabinet and aligned adjacent to the intake.

5. The arc resistant drive system of claim 1, further comprising:
    one or more ducts coupled to the drive cabinet for routing arc gas out of the drive cabinet.

6. An arc resistant shutter plate assembly comprising:
    one or more frames; and
    a plurality of shutter plates coupled to the one or more frames, wherein the plurality of shutter plates are aligned parallel to one another, and wherein the plurality of shutter plates are operable to automatically transition from an open position and a closed position based on a change in surrounding air pressure,
    wherein the arc resistant shutter plate assembly is coupled to a vent of a drive cabinet and an exhaust fan assembly, wherein the arc resistant shutter plate assembly is disposed internal to the drive cabinet.

7. The arc resistant shutter plate assembly of claim 6, wherein the change in air pressure required to automatically transition the plurality of shutter plates from the open position to the closed position is 5 psi.

8. The arc resistant shutter plate assembly of claim 6, wherein the plurality of shutter plates are comprised of carbon steel.

9. The arc resistant shutter plate assembly of claim 6, wherein the plurality of shutter plates are coupled to one or more frames via hex lock nuts.

10. The arc resistant shutter plate assembly of claim 9, wherein the hex lock nuts are torqued to a value of 2-20 ft-lbs.

11. The arc resistant shutter plate assembly of claim 6, wherein the plurality of shutter plates is comprised of at least five shutter plates.

12. A method for ventilating arc gas comprising:
- disposing an arc resistant shutter plate assembly over an exhaust vent, wherein the arc resistant shutter plate assembly is coupled to a drive cabinet;
- automatically transitioning the arc resistant shutter plate assembly from an open position to a closed position upon a change in air pressure;
- directing air flow within the drive cabinet to an arc gas chamber, wherein the arc gas chamber is disposed on top of the drive cabinet; and
- ventilating air flow out of the arc gas chamber and the drive cabinet.

13. The method of claim 12, further comprising:
- disposing a second arc resistant shutter plate assembly over an intake, wherein the second arc resistant shutter plate assembly is coupled to the drive cabinet.

14. The method of claim 12, wherein the arc resistant shutter plate is automatically transitioned from the open position to the closed position when the air pressure on one side of the shutter plate assembly exceeds air pressure on another side by a predetermined value.

15. The method of claim 12, further comprising receiving arc gas into an arc gas chamber redirected by the shutter plate assembly in the closed position.

16. The method of claim 15, further comprising ventilating arc gas out of the drive cabinet by the arc gas chamber.

17. The method of claim 12, further comprising positioning an exhaust fan assembly, wherein the arc resistant shutter plate assembly is disposed between the drive cabinet and the exhaust fan assembly.

18. The method of claim 12, further comprising routing arc gas out of the drive cabinet via one or more ducts coupled to the drive cabinet.

* * * * *